Jan. 1, 1952     A. R. BUCHHOLZ ET AL     2,581,074
FEED CONTROL FOR COUNTING MACHINES
Filed Nov. 15, 1946                            3 Sheets-Sheet 1

INVENTORS
Arnold R. Buchholz
Walter A. Barganz
BY
Quarles & French
ATTORNEYS

Jan. 1, 1952
A. R. BUCHHOLZ ET AL
2,581,074
FEED CONTROL FOR COUNTING MACHINES
Filed Nov. 15, 1946
3 Sheets—Sheet 2
Fig. 2.
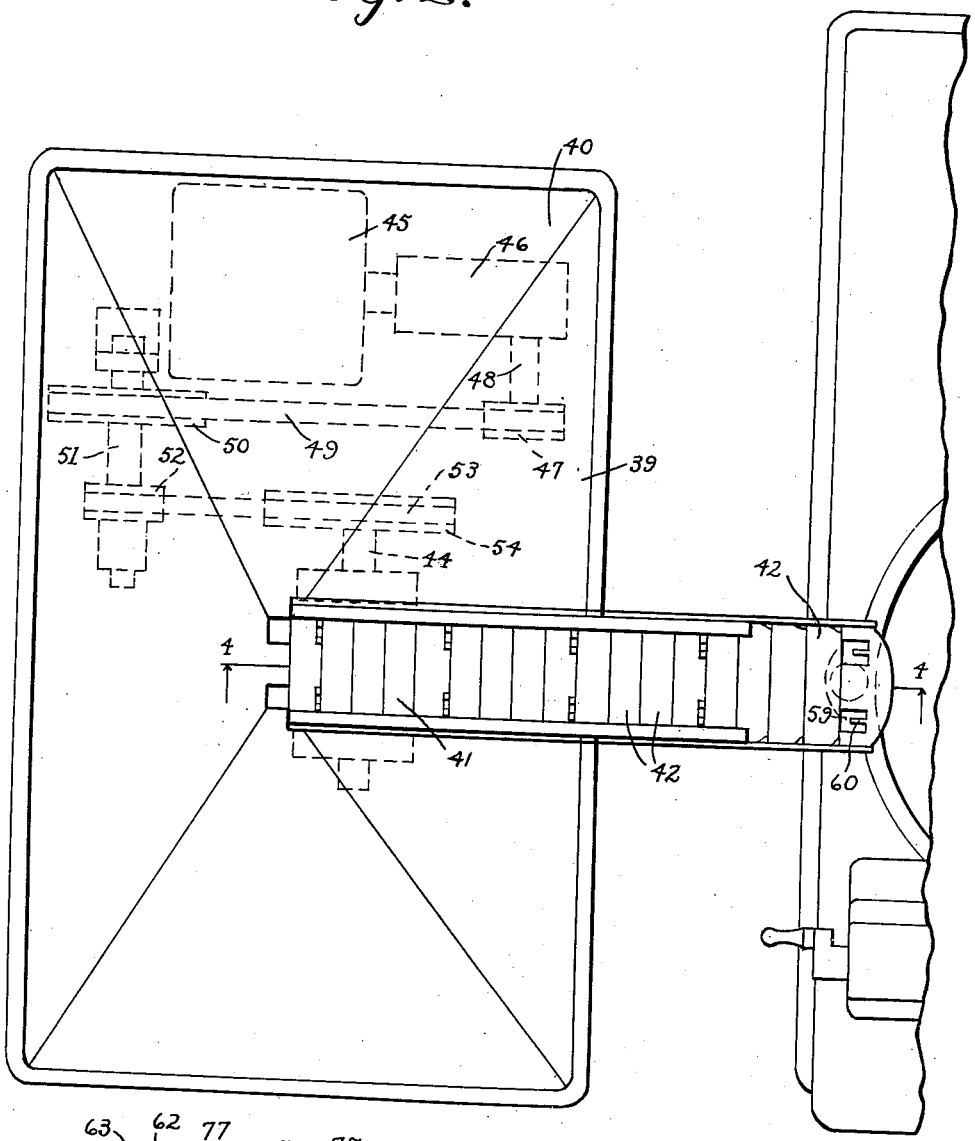
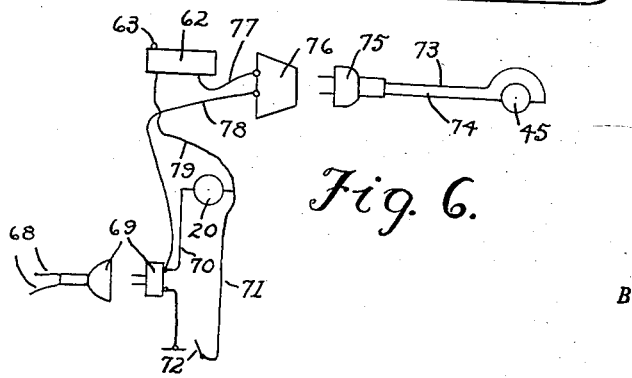
Fig. 6.
INVENTORS
Arnold R. Buchholz
Walter A. Barganz
BY
Charles & French
ATTORNEYS Jan. 1, 1952
A. R. BUCHHOLZ ET AL
2,581,074
FEED CONTROL FOR COUNTING MACHINES
Filed Nov. 15, 1946
3 Sheets-Sheet 3
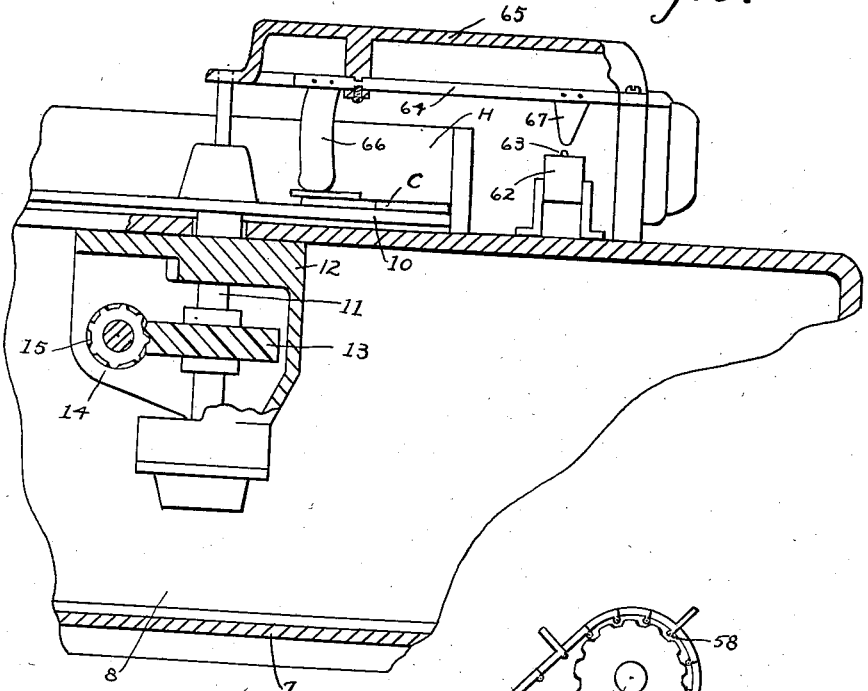
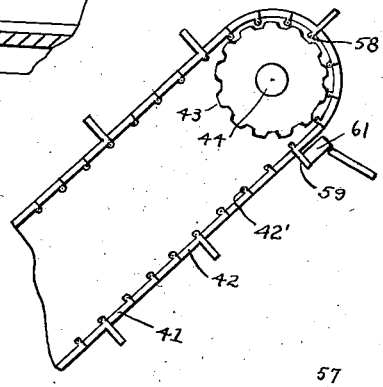
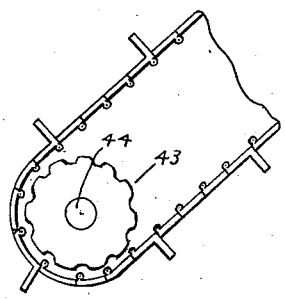
INVENTORS
Arnold R. Buchholz
BY Walter A. Barganz
Quarles & French
ATTORNEYS Patented Jan. 1, 1952

2,581,074

UNITED STATES PATENT OFFICE 2,581,074

FEED CONTROL FOR COUNTING MACHINES

Arnold R. Buchholz and Walter A. Barganz, Watertown, Wis., assignors to Brandt Automatic Cashier Company, Watertown, Wis., a corporation of Wisconsin.

Application November 15, 1946, Serial No. 709,962

3 Claims. (Cl. 133—8)

The invention relates to counting machines and more particularly to mechanism for supplying the articles to be counted thereto from a relatively large storage space.

The main object of the invention is to provide an article feeder associated with a counting machine of the type in which the articles are fed into a hopper including a rotating disk by which the articles are carried outwardly by centrifugal force and carried through a gauged opening and under a drive wheel while engaging a rotatable member which is operatively connected to the counter to thereby register the number of articles delivered from the hopper. Usually in counting machines of this character the hopper of the counting machine is hand fed or electrically fed. In either case it requires an operator's constant attendance, and if electrically fed, he must constantly be on the alert to turn the power off before the hopper becomes too full, otherwise it clogs the counting machine, and he must also be on the alert to turn on the power at the right time so as to keep sufficient articles in the hopper at all times so as not to slow down the flow of articles to the counter. According to the present invention, a large hopper or storage space is filled with articles to be counted, and the feeder mechanism is driven by a motor controlled by the number of articles in the hopper of the counting machine, so that at no time will this last named hopper be either overloaded or underloaded, and the feeder mechanism will be operated automatically off and on until the articles from the storage space are exhausted. Feeder mechanism is so designed as to constantly keep sufficient articles in the counting machine hopper as to enable the counting machine to never be waiting for articles to count as long as there are articles in the large hopper or storage space. Under the previous systems one either had to hand feed coins from an auxiliary storage space into the hopper or else if they had an electric feed, they had to constantly be watching the counting machine hopper to shut off the feed when it became too full and to turn it on when it was sufficiently depleted.

The invention further consists in the several features hereinafter set forth and more particularly defined by claims at the conclusion hereof.

In the drawings:

Fig. 2 is an elevation view similar to Fig. 1 showing other parts broken away;

Fig. 3 is a detailed vertical sectional view taken on the line 3—3 of Fig. 1, parts being broken away;

Fig. 4 is a side view of the conveyor, parts being broken away;

Fig. 5 is a detailed elevation view of one of the conveyor flights;

Fig. 6 is a wiring diagram.

Figure 1:
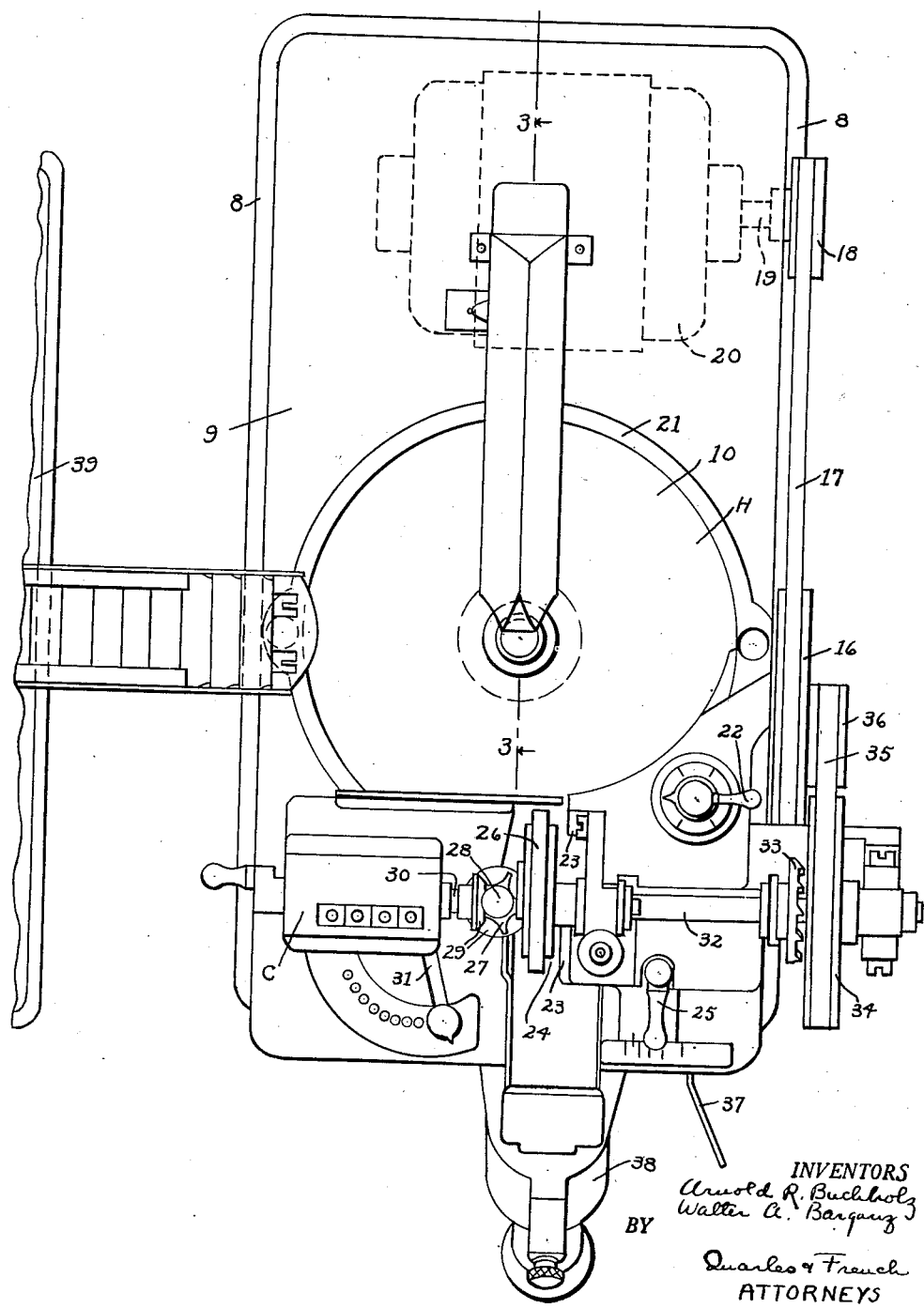
Fig. 1 is an elevation view of the counting machine embodying the invention, parts being broken away.

While the machine shown herein is frequently used for the counting and packaging of coins, it is to be understood that it may be used for counting other articles such as metal disks, buttons, and the like.

The counting machine shown herein is similar to that shown and described in detail in United States Letters Patent No. 2,378,828, of June 19, 1945, of Arnold R. Buchholz and Walter A. Barganz, to which reference may be had, the present invention dealing with the addition to that machine of an automatically operated feeder mechanism for supplying this machine with the articles, such as coins, to be counted.

The patented machine and the machine herein shown includes a casing having a base 7, sides 8, and a top 9. An article carrier 10 in the form of a disk is rotatably mounted on a vertically disposed shaft 11 suitably journalled in a bearing frame 12, secured to the casing, and carrying a skew gear 13 meshing with a similar gear 14 on an angularly disposed shaft 15 projecting through one side of the casing and carrying a pulley 16 connected by a belt 17 with the pulley 18 on the drive shaft 19 of an electric motor 20, not shown in Fig. 3, but disposed within the rear portion of the casing as shown in Fig. 1. Articles, such as coins, are charged into the hopper H formed by the carrier 10 and a fence or wall 21 which as shown in detail in said patent is open at one point to permit the discharge of the articles, and this opening includes a gauging means controlled by a manually adjustable lever 22 to gauge the thickness of the coins, so that the machine will count, in the case of coins, coins of different denominations, such as pennies, nickels, dimes, quarters, half dollars, and dollars. After passing this thickness gauging means, the coins are gauged as to width by an adjustable gate 23 which determines the diameter of the coin that may be released from the carrier 10 into a discharge passage 24. The gate 23 is adjustably secured in position by a clamping lever 25 and also provides an adjustable space at the periphery of the carrier 10 adjacent the passage 24 into which the coins are thrown by the rapid rotation of the carrier and along which they move into the entrance of the passage 24. Associated with the passage 24 is a rubber faced feed wheel 26 which is mounted so that its periphery is spaced a slight distance from the bottom of the passage 24 so as to engage the coins as they are discharged and carryy them past and in contact with a counter drive wheel 27.

The counter drive wheel 27 is mounted on a vertically disposed shaft 28 connected by bevel gearing 29 with a drive shaft 30 for the counter C. The counter C includes means for adjusting it to stop the feed of the coins after a predetermined number of revolutions or part revolutions thereof and includes a manually settable lever 31. For example, the lever 31 may be set so that the machine delivers 10, 15, 20, 25, 30, 35, 40, or 50 coins or other articles before the drive of the coin feed and counter operating wheel 26 is stopped.

The feed wheel 26 is mounted on a shaft 32 suitably journalled on the machine and operatively connected by a disconnectible clutch 33 with a pulley 34 connected by a belt 35 with a pulley 36 on the shaft 15, so that said pulley 34 is continuously driven by the motor 20, but the shaft 32 is only driven when the clutch 33 is engaged.

As more particularly described and shown in said patent, the clutch 33 may be engaged on the operation of a hand lever 37 and is automatically disengaged under the control of the counter 30 when the required number of articles or coins has been counted, so that this number can be packaged if desired by connection of a suitable receptacle with the discharge spout 38.

It will be noted that this application starts as its basis with a counting machine having a motor driven carrier 10 by which the articles are rapidly carried outwardly from its center to the peripheral portion thereof from which at one point they are discharged past the counter drive wheel 27. With such machines too great a loading of the hopper may cause a jamming of coins adjacent the gauging outlet and hence delay and some time of the operator is spent in loading the machine and keeping it properly supplied with coins.

To overcome the above named difficulties and to increase the output of the counting machine, we have devised a loader or feeding mechanism for the articles in which their introduction is automatically controlled by the amount of such articles as have been supplied to said hopper H.

Referring to Fig. 2, we have shown a casing formed to provide a large storage hopper 39 or bin whose walls 40 slope downwardly to a central point from which rises an endless conveyor 41 whose upper end projects beyond the hopper, so that it may be positioned to project over the hopper H of the counting machine previously described as shown in Figs. 1 and 2. The conveyor 41 is formed of flights 42 connected together by pins 42' running over sets of spaced sprockets 43 mounted on shafts 44, the lower of which is driven from an electric motor 45 through a suitable gear reduction 46 and pulley and belt connections. As herein shown, said connections include a pulley 47 on reduced speed shaft 48 connected by a belt 49 with a pulley 50 on an intermediate shaft 51 which carries a pulley 52 connected by a belt 53 to a pulley 54 on the lower shaft 40 of the conveyor.

Each of the conveyor flights 42 is formed to provide spaced pivot pin supporting ears 55 at one side at their ends and pin supporting ears 56 spaced inwardly from their ends at the other side to abut the ears 55 of the next flight, and at this side also a long pin supporting bearing 57 is provided. The ears 55 and 56 of adjoining conveyor flights cooperate to form tooth projections 58 which mesh with the teeth of the gears 43, so that the conveyor is positively driven. Some of the conveyor flights have upstanding projections 59 which act as elevators, and these projections have centrally disposed slots 60 which cooperate with fixed stripper bars 61 at the upper end of the conveyor run to prevent the articles returning with the return run of the conveyor and thus insure their dropping by gravity from the upper elevated end of the conveyor down into the hopper of the counting machine. While we have shown a conveyor form of feeder, other types of power controlled feeders may be used to supply the hopper H with the articles, so that it is to be understood that this invention is not to be limited to the specific feeding or delivering means herein shown.

In order to prevent the delivering means, such as the conveyor 41, from supplying a greater quantity of articles than can be efficiently handled by the counting machine, means are provided controlled by the amount of coins or articles fed to the counting machine for controlling the conveyor drive motor 45. This means includes a switch 62 of the normally closed type and which may be of the leaf spring type of known construction and switch control mechanism operated by the articles on the carrier 10 for moving the movable member 63 of said switch to open the same so as to stop the drive of the motor whenever a sufficient quantity of articles have been delivered to the counting machine. The switch control mechanism comprises an oscillatory shaft 64 journalled in a support 65 overhanging the carrier and carrying a coin engaging arm or sensing means 66 and a switch engaging arm 67. With this arrangement when more than one layer of coins or articles tend to collect or pile up in the hopper H at a point back from the periphery of the disk 10, as shown in Fig. 3, the uppermost of these coins on being carried under the arm 66 will lift or swing the same upwardly and turn the shaft 64, and due to its angular relation with the arm 67, said arm 67 is swung downwardly, thus depressing the switch member 63 to open the switch 62, it being noted that the weight of the arm 66 tends always to keep its lower end in a position where it may contact a greater height of articles than that which may form a single layer on the disk 10. Thus as long as any articles in the hopper H are engaging the arm 66, the switch 62 remains open, and no further feed of articles from the storage source occurs. As shown the switch operates on coins in the second row formed by the centrifugal displacement of the coins on the table 10, and as soon as coins or articles of the outer row are discharged past the drive wheel 27, the other coins or articles from the inner portion of the disk move out to take their place and thus move out of contacting engagement with the arm 66, so that the arm may swing down due to gravity turning the shaft 64 and moving arm 67 out of engagement with the member 63, so that switch 62 closes and the motor 45 is again energized to drive the conveyor.

Referring to Fig. 6, a circuit wiring diagram is shown in which 68 designates current supply lines, 69 a disconnectible plug connecting said source of current with circuits for the motors 20 and 45. As shown, the motor 20 is connected to one of the supply conductors 68 by a conductor 70 and to the other by a supply conductor 71 in which is a manually controlled start and stop switch 72 for the counting machine. The motor 45 has its terminals 73 and 74 connected to an extension plug 75 which plugs into a socket 76 adjacent the overhanging support 65. One of the terminals of socket 76 is connected with one of the contacts of switch 62 by a conductor 77, the other terminal being connected by a conductor 78 with one of the supply lines. The other contact of the switch 62 is connected by a conductor 79 with the conductor 71, so that the switch 72 also controls the motor 45.

We desire it to be understood that this invention is not to be limited to any particular form or arrangement of parts except in so far as such limitations are included in the claims.

What we claim as our invention is:

1. In a coin counting machine having a hopper provided with a horizontally disposed rotary plate forming the bottom thereof and by which articles introduced into said hopper in bulk are rotated and distributed as layers of coins and carried out to the peripheral portion of the plate by centrifugal force, the combination with a storage receptacle for coins to be counted, of an electric motor, an electric circuit including a source of current for said motor, means operated by said motor for delivering a coin from said receptacle to said hopper, a depending oscillatory finger mounted above said plate inwardly of its peripheral portion and operable by articles in bulk in said hopper as the layers of coins are carried around by said plate and build up on said plate to an overload condition sufficient to engage said finger, switch mechanism in said circuit controlling the starting and stopping of said motor, and an operative connection between said finger and said switch mechanism to open said switch mechanism to stop said motor when said finger is moved by a coin moving under said finger when the hopper tends to become overloaded and to permit closing of said circuit to said motor by said switch mechanism when said hopper becomes underloaded.

2. In a coin counting machine, the combination of a counter and a hopper with a rotary member forming the bottom thereof by which coins introduced into said hopper in bulk are distributed on said rotary member in layers and in which the coins in layers are carried out by centrifugal force to the peripheral portion of said member for passage past said counter, a storage receptacle for the coins to be counted, electrically operated means for delivering coins from said receptacle to said hopper, an electrical circuit including a source of current and a control switch, and means projecting into said hopper from above and inwardly of its peripheral portion, and engageable with coins in said hopper to operate said control switch to stop said electrically operated means to prevent overloading said hopper.

3. In a coin counting machine, the combination of a counter and a hopper provided with a horizontally disposed rotary member forming the bottom thereof by which coins introduced into said hopper in bulk are distributed on said rotary member in layers and in which the coins are carried out by centrifugal force to the peripheral portion of said member for passage through an outlet from said hopper past said counter, a bulk storage receptacle for coins to be counted, power operated means for supplying coins from said receptacle to said hopper, and coin controlled control means for said power operated means operable automatically to prevent the building up of coins on said rotary member to an overload condition.

ARNOLD R. BUCHHOLZ.
WALTER A. BARGANZ.

REFERENCES CITED

The following references are of record in the file of this patent:

UNITED STATES PATENTS

| Number | Name | Date |
|---|---|---|
| 1,024,057 | Bock | Apr. 23, 1912 |
| 1,175,529 | Kinberg | Mar. 14, 1916 |
| 1,259,524 | Kelly | Mar. 19, 1918 |
| 1,350,148 | Garami | Aug. 17, 1920 |
| 1,515,774 | Jones | Nov. 18, 1924 |
| 1,776,251 | Donnellan | Sept. 23, 1930 |
| 1,803,689 | Bernadt | May 5, 1931 |
| 1,907,089 | Pabst | May 2, 1933 |
| 2,170,288 | Kiss | Aug. 22, 1939 |

FOREIGN PATENTS

| Number | Country | Date |
|---|---|---|
| 517,972 | Great Britain | Feb. 14, 1940 |